(12) United States Patent
Bhat et al.

(10) Patent No.: US 8,639,982 B2
(45) Date of Patent: Jan. 28, 2014

(54) DYNAMIC COMPUTER PROCESS PROBE

(75) Inventors: Kavana N. Bhat, Bangalore (IN);
Muthulakshmi P. Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 13/164,505

(22) Filed: Jun. 20, 2011

(65) Prior Publication Data

US 2012/0324292 A1    Dec. 20, 2012

(51) Int. Cl.
*G06F 11/00* (2006.01)
(52) U.S. Cl.
USPC .......................................................... 714/33
(58) Field of Classification Search
USPC .......................................................... 714/33
See application file for complete search history.

(56) References Cited

U.S. PATENT DOCUMENTS

| | | | |
|---|---|---|---|
| 6,233,678 B1 | 5/2001 | Bala | |
| 6,513,155 B1 | 1/2003 | Alexander, III et al. | |
| 7,013,456 B1 | 3/2006 | Van Dyke et al. | |
| 7,093,234 B2 | 8/2006 | Hibbeler et al. | |
| 2009/0113243 A1* | 4/2009 | Huang et al. | 714/25 |
| 2012/0110344 A1* | 5/2012 | Sadovsky et al. | 713/189 |

FOREIGN PATENT DOCUMENTS

WO    2009085088 A1    7/2009

OTHER PUBLICATIONS

Roll, Armin, AIX: The Future of UNIX, IBM Forum, Switzerland, Nov. 17, 2010.
Stapprobes(5):systemtap probe points, http://linux.die.net/man/5/stapprobes, Retrieved Jan. 18, 2011.

* cited by examiner

*Primary Examiner* — Michael Maskulinski
*Assistant Examiner* — Neil Miles
(74) *Attorney, Agent, or Firm* — Kunzler Law Group, PC

(57) ABSTRACT

An apparatus, system, and method are disclosed for probing a computer process. A probe parameter module determines a process identifier, a probe interval, and a probe action. The process identifier uniquely identifies a computer process. A start timer module starts a timer with a timer interval in response to the computer process entering an executing state on a processor core. The timer interval is based on the probe interval and on an amount of time elapsed between a probe start time and the computer process entering the executing state on the processor core. An action module executes the probe action in response to the timer satisfying the timer interval while the computer process is in the executing state on the processor core.

25 Claims, 9 Drawing Sheets

DYNAMIC COMPUTER PROCESS PROBE

BACKGROUND

1. Field

The subject matter disclosed herein relates to computer process profiling and more particularly relates to dynamic probes for profiling computer processes.

2. Description of the Related Art

In computer systems, tracing or probing is a tool to record information about a program's execution or perform actions at certain points during a program's execution. This information is often used by programmers or other technical support personnel for debugging purposes and to diagnose problems with executing computer processes. To obtain tracing information, tracing tools use probes to profile or otherwise test programs.

Traditional tracing probes, however, have several limitations. Because each traced process typically has its own probing parameters associated with it, and multiple threads and processor cores are often involved, tracing or probing multiple processes can result in a degradation of system performance and usability.

BRIEF SUMMARY

From the foregoing discussion, it should be apparent that a need exists for an apparatus, system, and method that probe executing processes without degradation of system performance or usability. Beneficially, such an apparatus, system, and method would allow for more effective computer program development and debugging, even with multi-threaded operations and multi-core processors, with little or no degradation or loss of system performance.

The present invention has been developed in response to the present state of the art, and in particular, in response to the problems and needs in the art that have not yet been fully solved by currently available computer process probes. Accordingly, the present invention has been developed to provide an apparatus, system, and method for dynamically probing a computer process that overcome many or all of the above-discussed shortcomings in the art.

A method of the present invention is presented for probing a computer process. The method in the disclosed embodiments substantially includes the steps necessary to carry out the functions presented below with respect to the operation of the described apparatus and system. In one embodiment, the method includes determining a process identifier, a probe interval, and a probe action. The process identifier, in certain embodiments, uniquely identifies a computer process. The method, in a further embodiment, includes starting a timer with a timer interval in response to the computer process entering an executing state on a processor core. The timer interval, in one embodiment, is based on the probe interval and on an amount of time elapsed between a probe start time and the computer process entering the executing state on the processor core. In another embodiment, the method includes executing the probe action in response to the timer satisfying the timer interval while the computer process is in the executing state on the processor core.

An apparatus to probe a computer process is provided with a plurality of modules configured to functionally execute the necessary steps of probing a computer process. These modules in the described embodiments include a probe parameter module, a start timer module, and an action module.

In one embodiment, the probe parameter module determines a process identifier, a probe interval, and a probe action. The process identifier, in a further embodiment, uniquely identifies a computer process. The start timer module, in one embodiment, starts a timer with a timer interval in response to the computer process entering an executing state on a processor core. The timer interval, in certain embodiments, is based on the probe interval and on an amount of time elapsed between a probe start time and the computer process entering the executing state on the processor core. In one embodiment, the action module executes the probe action in response to the timer satisfying the timer interval while the computer process is in the executing state on the processor core.

A system of the present invention is also presented to probe a computer process. The system may be embodied by a processor core, a probe parameter module, a start timer module, and an action module. In certain embodiments, the probe parameter module, the start timer module, and the action module are substantially similar to the modules described above with regard to the apparatus of the present invention.

Another method of the present invention is presented for probing a computer process. In one embodiment, the method includes determining a process identifier, a probe interval, and a probe action. The process identifier, in one embodiment, uniquely identifies a computer process. The method, in another embodiment, includes starting a timer with a timer interval in response to the computer process entering an executing state on a processor core. In another embodiment, the method includes executing the probe action in response to the timer satisfying the timer interval while the computer process is in the executing state on the processor core.

The timer interval, in one embodiment, is based on the probe interval and on an amount of time elapsed between a probe start time and the computer process entering the executing state on the processor core. In a further embodiment, the amount of time elapsed between the probe start time and the computer process entering the executing state on the processor core includes one or more cycles of the probe interval. The timer interval, in another embodiment, is an amount of time remaining in a current cycle of the probe interval.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
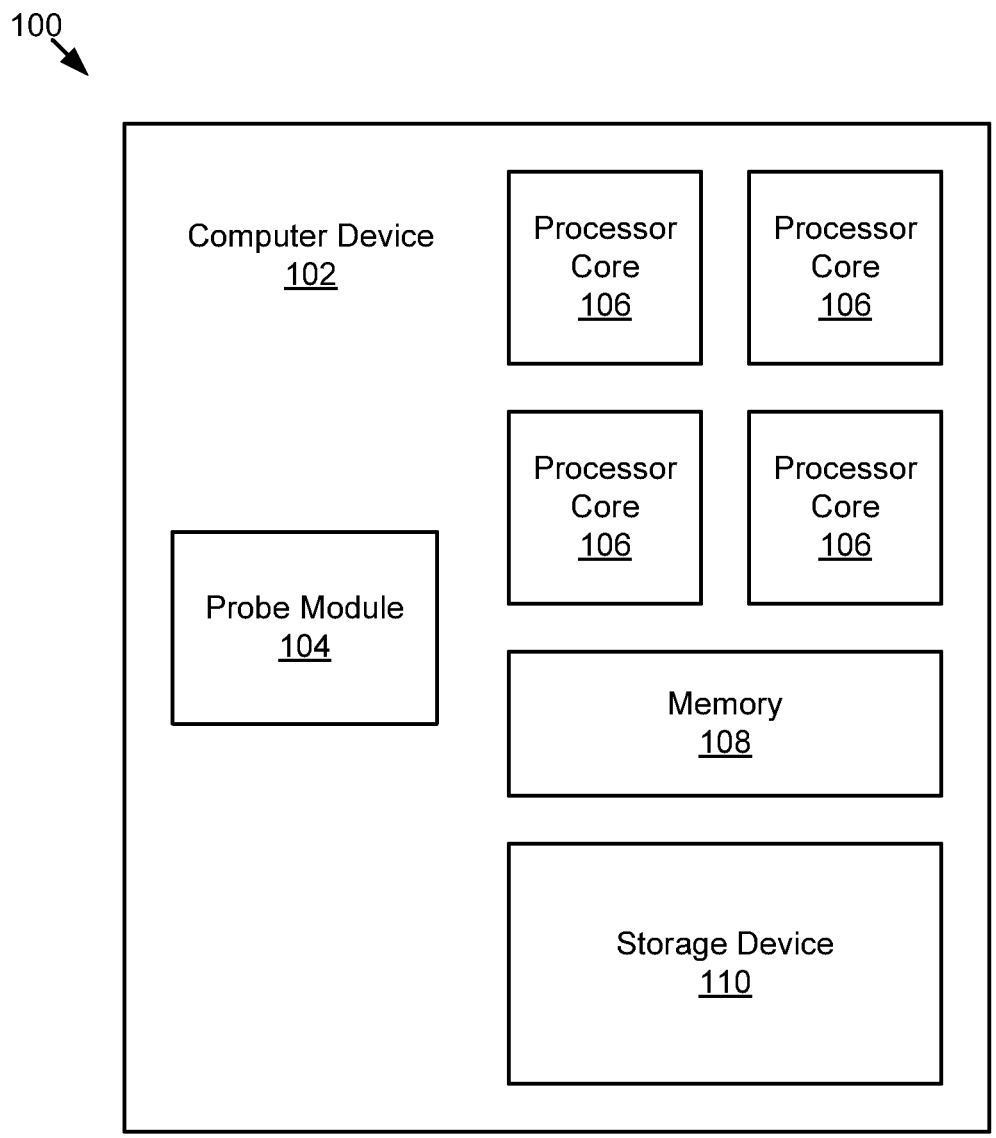
FIG. 1 is a schematic block diagram illustrating one embodiment of a system for probing a computer process in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending on the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 depicts one embodiment of a system 100 for probing a computer process. The system 100, in the depicted embodiment, includes a computer device 102, a probe module 104, processor cores 106, a memory 108, and a storage device 110. The computer device 102 executes several computer processes on the processor cores 106. The system 100, in certain embodiments, provides an interface for an engineer, programmer, or technician to develop, test, debug, or otherwise enhance computer executable processes by tracing or probing executing processes.

Specifically, the system 100, in one embodiment, uses interval probes to test executable code or to perform predefined actions during execution of the executable code. By probing, tracing, and/or profiling a process with a probe, a developer or other user can gather information from an executing process or from the system 100 in general to enhance or improve the process.

The processor cores 106, the memory 108, the storage device 110, and the probe module 104 work together in the system 100 to probe new or existing computer processes. In certain embodiments, the probe module 104 is configured to execute a predefined probe action at intervals, if a specified process is executing, i.e. is in an executing state on a processor core 106. The probe module 104, in one embodiment, runs a timer when an identified process is in an executing state on a processor core 106 and executes the predefined probe action for the process if the timer is satisfied while the process is still in an executing state. The probe module 104 may stop the timer if a process stops executing, to save computing resources of the system 100 and to enhance performance of the system 100. In certain embodiments, running a timer only while a computer process is in an executing state on a processor core 106 allows the probe module 104 to probe more processes simultaneously, to probe processes more effectively or efficiently, or the like.

The processor cores 106 provide processing power for the system 100 and specifically for the computer device 102. The computer device 102 may include a desktop computer, a server computer, a laptop computer, a tablet computer, a mobile phone, an entertainment device, a set-top box, or another electronic device with one or more processor cores 106. The processor cores 106 perform calculations and operations defined by executable code of computer processes. Typically, a scheduler associated with one or more processor cores 106 dispatches computer processes to and from the processor cores 106 in succession, allowing many computer processes to share a processor core 106, providing for multitasking on the computer device 102, even in embodiments with a single processor core 106.

In one embodiment, the processor cores 106 perform operations defined by executable code of the probe module 104. In a further embodiment, the probe module 104 may be integrated with the processor cores 106 as logic hardware, or the like. In one embodiment, the processor cores 106 may include a single processor core 106 on a single processor unit, multiple processor cores 106 on a single processor unit, multiple processor units, multiple processor units with multiple processor cores 106, or the like. Having multiple processor cores 106, in certain embodiments, may allow the system 100 to more efficiently execute identified computer processes, providing the system 100 with more resources and processing power than a single processor core 106.

A computer process, in certain embodiments, may include a plurality of threads, which may execute on several different processor cores 106. A process with multiple threads may run more efficiently on multiple processor cores 106 than a single threaded process, or may use multiple processor cores 106 more effectively in its execution. In various embodiments, to trace or probe computer processes with multiple thread across multiple processor cores 106, the probe module 104 may maintain several different timers, such as one timer for each processor core 106, one timer for each thread of the computer process, or the like. Each computer process, computer process thread, or the like, in one embodiment, is uniquely identified by a process identifier or a thread identifier to facilitate tracing and probing by the probe module 104.

In one embodiment, the memory 108 includes volatile memory, such as RAM or the like, and is a writeable memory which is used as a read area for programs that the processor cores 106 execute, or as a work area in which data associated with executing computer processes is stored. Executable computer code of the probe module 104 or of identified computer process, in certain embodiments, is stored or loaded temporarily into the memory 108. Additionally, processing files or other data that the processor cores 106 generate while executing computer processes may be stored in the memory 108.

In one embodiment, the storage device 110 include non-volatile storage, such as a hard disk drive or other magnetic storage device, Flash memory or other solid state storage device, an optical storage device, and/or another type of hardware storage device. The storage device 110, in certain embodiments, stores executable code of processes that the processor cores 106 executes. Additionally, in embodiments where the probe module 104 includes executable code, such as parameters or other executable code, the storage device 110 may store executable code of the probe module 104.

The probe module 104 probes, profiles, and/or traces one or more computer processes executing on the processor cores 106. The computer processes are typically associated with computer programs running on the computer device 102. In one embodiment, the probe module 104 probes computer processors based on probe parameters, such as process identifiers, probe intervals, probe actions, or the like, that can be defined by users. For example, a user may identify a computer process by a process identifier, and request that the probe module 104 execute a specified probe action when the identified computer process is in an executing state and an amount of time identified by a specified probe interval is satisfied.

The probe module 104, in certain embodiments, uses one or more timers to determine when to execute a probe action. Instead of running a timer for each probed computer process constantly and checking to see if an identified computer process is executing when the probe interval is satisfied, in one embodiment, the probe module 104 starts a timer in response to a probed computer process entering an executing state on a processor core 106. The probe module 104 may determine the timer interval based on a probe interval and on an amount of time that has elapsed since the probe was initiated. In this way the probe module 104 may determine how much time is left until the specified probe interval is satisfied, without running the timer when the computer process is not executing. In a further embodiment, the probe module 104 stops the timer for a computer process in response to the computer process exiting an executing state on a processor core 106. Because, in certain embodiments, the probe module 104 only starts a timer for a computer process if the computer process is in the executing state on a processor core 106, the probe module 104 can execute a probe action for the computer process when the timer satisfies the timer interval without first verifying that the computer process is currently executing, thus saving computing resources and enhancing performance of the system 100.

In one embodiment, the probe module 104 performs one or more functions, such as determining probe parameters, starting and/or stopping timers, and executing probe actions, dynamically and independently from the computer processes that the probe module 104 profiles or traces. For example, the probe module 104 may operate using protocols of the computer device 102, an operating system or kernel, the processor cores 106, the memory 108, and/or other protocols of the system 100, instead of relying on executable code or trace hooks compiled into the profiled computer processes. Stated another way, in certain embodiments, the probe module 104 operates as a dynamic probe or dynamic tracing facility, without adding any additional profiling code or trace hooks to the probed computer processes. One benefit of a dynamic probe is that a user can define or adjust probe parameters at runtime without recompiling the associated computer program, allowing for greater flexibility in the tracing and testing process. Furthermore, a dynamic probe allows a user to probe a process for which source code may not be available, a process that is precompiled, or a process for which the user simply does not wish or need to modify in order to test. Additionally, in certain embodiments, trace hooks of the probe module 104 may be dynamically enabled or disabled without modifying executable code.

Figure 2:
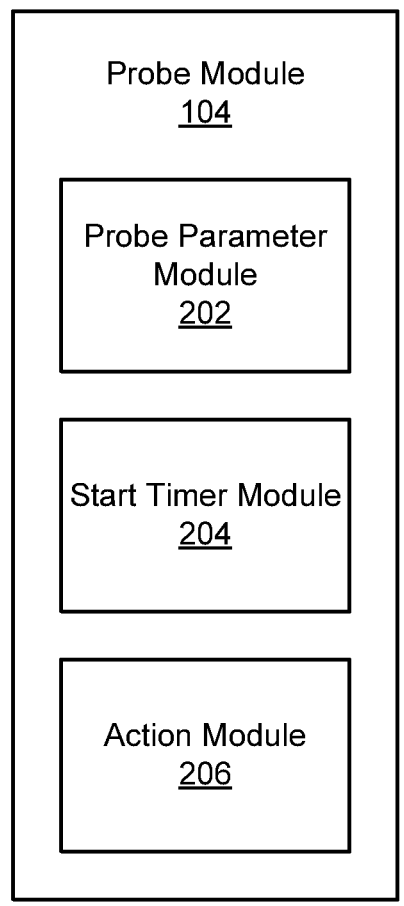
FIG. 2 is a schematic block diagram illustrating one embodiment of a probe module in accordance with the present invention.

FIG. 2 depicts one embodiment of a probe module 104. In the depicted embodiment, the probe module 104 includes a probe parameter module 202, a start timer module 204, and an action module 206. In certain embodiments, the probe module 104 may be substantially similar to the probe module 104 described above with regard to FIG. 1. The probe module 104, as described above with regard to FIG. 1, profiles, probes, or traces executing processes for a user, providing statistics or other information associated with the executing processes to the user and/or performing probe actions associated with the executing processes.

The probe parameter module 202 determines probe parameters for the probe module 104 relating to the profiling or executing of a computer process. In certain embodiments, and the probe parameters may include a process identifier, a probe interval, a probe action, or the like. These probe parameters may be set programmatically, input manually by a user, or by a combination of those or other methods. Probe parameters may be stored on the storage device 110, may be written into the memory 108 for access by a processor core 106 during execution, probing, or profiling of an identified process, may be stored in registers or cache memory of a processor core 106, or may otherwise be accessible to and/or stored by the probe parameter module 202.

In one embodiment, the probe parameter module 202 determines a process identifier for a profiled computer process. A process identifier uniquely identifies a computer process from other computer processes executing on the same computer device 102. One example of a process identifier is a process ID ("PID") that is maintained by an operating system kernel. In certain embodiments, process identifiers may be reused or reassigned once an associated computer process is no longer running. Another example of a process identifier is the name and/or path of an executable file associated with the associated computer process.

The probe parameter module 202, in another embodiment, determines a probe interval for a profiled computer process. A probe interval, in one embodiment, is a frequency at which the probe module 104 performs a probe action should the associated computer process be in an executing state when the probe interval is satisfied. The probe interval, for example, may be specified in units of time, such as seconds, milliseconds, microseconds, nanoseconds, or the like.

In certain embodiments, the probe parameter module 202 determines a probe action for a profiled computer process. The probe module 104 executes the probe action should the profiled computer process be executing on a processor core 106 when the associated probe interval is satisfied. In one embodiment, a probe action is defined by computer executable code, such as a script or other series of commands. In a further embodiment, a probe action may be selected from a set of predefined actions. Probe actions may capture data related to a state of the associated computer process, a processor core 106, and/or the memory 108; may store data in a log; may make an operating system call; may write data to the command line or to a graphical user interface; or may perform another predefined action.

In other embodiments, the probe parameter module 202 may determine other probe parameters for the probe module 104. For example, the probe parameter module 202 may determine how many processor cores 106 the computer device 102 has, how many threads a computer process has, or the like. An interface for defining probe parameters is described below with regard to the probe definition module 306.

The start timer module 204 manages timers associated with the tracing or probing of identified computer processes. A timer, in one embodiment, is based on a system clock of the computer device 102 and runs at a system clock interrupt level. While several different timers and arrangements of timers are described herein, as will be apparent to one of skill in the art in light of the present disclosure, a single timer may be reused multiple times, a timer may comprise a logical or software construct or data structure that is re-instantiated each time the timer is started, or timers may be otherwise arranged. The start timer module 204 starts a timer for a computer process when the computer process associated with the timers begins executing on a processor core 106, entering an executing state. As described below with regard to the stop timer module 302 of FIG. 3, in certain embodiments, a stop timer module 302 works with the start timer module 204 to stop a timer when an associated computer processes is dispatched from the processor core 106, exiting the executing state.

The start timer module 204, in one embodiment, maintains a single timer for a computer process that the probe module 104 traces. For example, if a traced computer process is single threaded, the start timer module 204 may run a single timer for the computer process, even when the computer process is run on multiple processor cores 106. In another embodiment, where a traced computer process has multiple threads, the start timer module 204 may associate a timer with each thread, and start the timer of a thread when the thread is dispatched to a processor core 106. In an alternative embodiment, instead of maintaining a timer per thread of a multi-threaded computer process, the start timer module 204 may maintain a timer for each processor core 106 of the computer device 102, and start the timer for a processor core 106 when any one thread of the computer process is dispatched to the processor core 106.

The start timer module 204 determines when a traced computer process enters an executing state on a processor core 106 using an application programming interface ("API") or other protocol of an operating system kernel. For example, the start timer module 204 may register with an operating system of the computer device 102 to receive a notification when the kernel dispatches an identified computer process to a processor core 106 for execution. In another embodiment, the start timer module 204 may identify when a computer process is executing by examining executable code or other data in the memory 108. In other embodiments, the start timer module 204 may start a timer for a computer process based on an interrupt, watching or listening to or for the computing process itself, or the like.

The start timer module 204, in one embodiment, starts a timer with a timer interval. The timer interval, in certain embodiments, is an amount of time remaining from when a computer process enters an executing state to when a next probe interval is satisfied. For example, the start timer module 204 may base a timer interval on a probe interval defined for a computer process and on an amount of time since a probe start time. The probe start time for a computer process, in one embodiment, is a time at which the probe module 104 begins tracing the computer process.

By determining an amount of time remaining in a probe interval, and using that amount of time as a timer interval, the start timer module 204 can run the timer for a computer process only while the computer process is executing on a processor core 106, conserving resources when the computer process is not executing. Determining a timer interval is described in greater detail below with regard to the timer interval module 304 of FIG. 3. In certain embodiments, the timer interval for a computer process is based on a probe interval for the computer process, but is different than the probe interval in that the start timer module 204 adjusts the timer interval dynamically depending on the executing state of the computer process, where the probe interval is always constant. In a further embodiment, both intervals run based on a system clock of the system 100, and may at certain times equal the same amount of time.

In one embodiment, the start timer module 204 starts a timer associated with a computer process in response to the computer process entering an executing state on a processor core 106. The start timer module 204 sets the timer interval for the timer, in one embodiment, based on the probe interval defined for the computer process and on an amount of time that has elapsed between a probe start time and the time that the computer process entered the executing state on the processor core 106. For example, in certain embodiments, the start timer module 204 uses the probe interval and the probe start time to determine an amount of time remaining in a current cycle of the probe interval when the corresponding computer process begins executing, and the start timer module 204 uses the amount of time remaining as the timer interval. One example of an equation that the start timer module 204 may use to determine a timer interval ("$I_{timer}$") is the difference between a current time ("$T_{curr}$") and the probe start time ("$T_{start}$"), modulo the probe interval ("$I_{probe}$"), subtracted from the probe interval $I_{probe}$, given as:

$$I_{timer} = I_{probe} - (T_{curr} - T_{start}) \bmod (I_{probe}) \quad \text{(Eq. 1)}$$

Equation 1 effectively provides the timer interval $I_{timer}$ as the amount of time left in a current cycle of the probe interval $I_{probe}$. For example, if the probe interval $I_{probe}$ for a traced computer process equals 100 ms (0.1 sec) and it has been 3.73 sec since the probe module 104 began profiling or tracing the computer process when the computer process enters an executing state on a processor core 106, $I_{timer}$=100 ms−(3.73 sec)mod(100 ms)=70 ms, meaning that it has been 37 full cycles of the probe interval with 70 percent of a current cycle of a current cycle of the probe interval remaining, or 70 ms. In the example, the start timer module 204 starts a timer with a timer interval of 70 ms.

When starting a timer for an executing computer process, the start timer module 204, in various embodiments, may start a new timer, restart an existing timer with an updated timer interval, or the like. In one embodiment, the start timer module 204 restarts a timer with the full probe interval for the timer interval in response to the timer satisfying a previous timer interval while the computer process is in the executing state on a processor core 106. In one embodiment, the start timer module 204 is configured to use the full probe interval as the timer interval when restarting a timer, without basing the timer interval on the amount of time elapsed between the probe start time and the computer process reentering the executing state, consulting an equation such as Equation 1, or the like. In another embodiment, the start timer module 204 may base the timer interval on the probe interval and the amount of time elapsed between the probe start time and a current time when restarting a timer, and the result of an equation, such as Equation 1 or the like, may be the probe interval, because $(T_{curr}-T_{start}) \bmod (I_{probe})$ is zero at times when the difference between the current time and the probe start time is equally divisible by the probe interval.

In one embodiment, where a traced computer process has a single thread, the start timer module 204 starts a timer for the computer process in response to the computer process entering an executing state on any one of a plurality of processor cores 106. In a further embodiment, where a traced computer process has multiple threads, the start timer module 204 maintains several timers, such as a timer for each processor core 106, a timer for each thread of the traced computer process, or the like. For example, the start timer module 204 may start a timer associated with a first processor core 106 as a thread of the computer process enters an executing state on the first processor core 106, and the start timer module 204 may start a second timer corresponding to a second processor core 106 as another thread of the computer process enters an executing state on the second processor core 106, etc., maintaining separate timers for each processor core 106.

In another embodiment, the start timer module 204 maintains a timer for each thread of a multithreaded computer process, instead of a timer for each processor core 106. For example, the start timer module 204 may start a timer associated with a first thread of a computer process in response to the first thread entering an executing state on a processor core 106, and the start timer module 204 may start a second timer corresponding to a second thread of the computer process in response to the second thread entering an executing state on another processor core 106, etc., maintaining separate timers for each thread of the computer process.

The action module 206 performs or executes a probe action defined by the probe parameter module 202 for a traced computer process. As described above with regard to the probe parameter module 202, a probe action may be defined by another module, defined by a user, defined in a script, or otherwise determined by the probe parameter module 202. The probe parameter module 202 may provide a probe action to the action module 206 at a probe start time, at runtime of an associated computer process, dynamically in response to receiving a probe action from a user, or the like.

In one embodiment, the action module 206 executes the probe action for a computer process in response to a timer for the computer process satisfying a timer interval while the computer process is in the executing state on a processor core 106. In a further embodiment, the action module 206 re-executes a probe action for a computer process in response to a restarted timer satisfying an updated or reset timer interval while the computer process is in the executing state on a processor core 106. The action module 206 may use the memory 108 as a work area while performing the action on the identified process, and may store its results in the storage device 110, provide results via a log, a printout, a command line interface, or another method.

Figure 3:
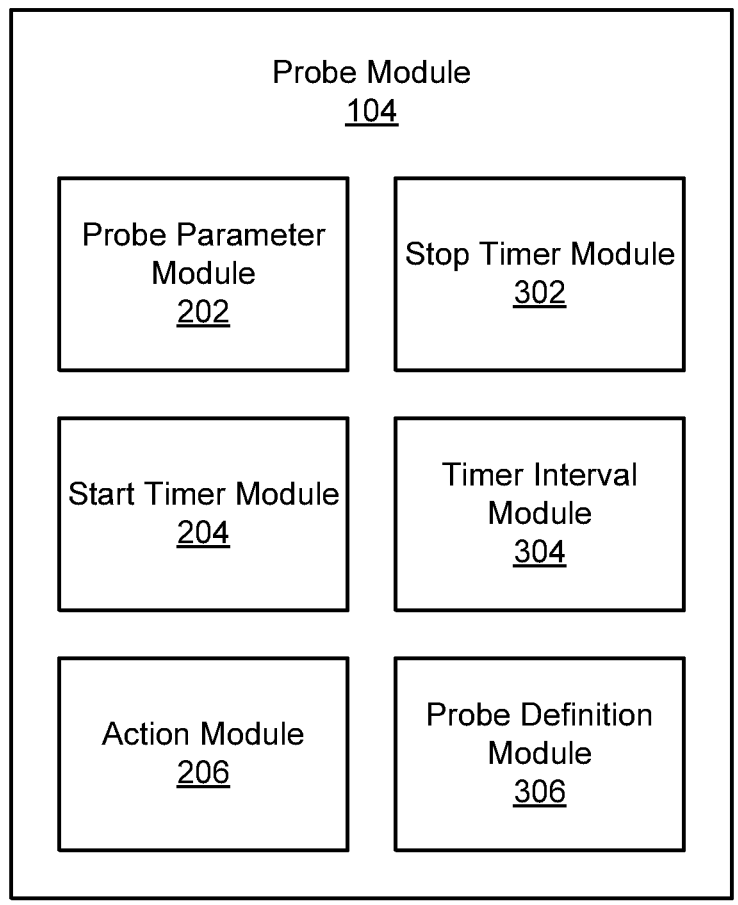
FIG. 3 is a schematic block diagram illustrating another embodiment of a probe module in accordance with the present invention.

FIG. 3 depicts another embodiment of a probe module 104. The probe module 104, in the depicted embodiment, includes the probe parameter module 202, the start timer module 204, and the action module 206, and further includes a stop timer module 302, a timer interval module 304, and a probe definition module 306. In certain embodiments, the probe parameter module 202, the start timer module 204, and the action module 206 may be substantially similar to the modules of the same description described above in FIG. 2.

The stop timer module 302, in one embodiment, stops a timer associated with a computer process, thread, or processor core 106 in response to a computer process exiting an executing state on a processor core 106. This results in the timer running while the computer process is in an executing state on a processor core 106 and not running while the computer process is not in an executing state, saving computing resources and limiting degradation of system performance, especially when profiling or tracing multiple computer processes simultaneously. The stop timer module 302, in various embodiments, may determine that a computer process has exited an executing state on processor core 106 by using an operating system kernel API or other protocol, by receiving an interrupt or other alert, by monitoring a state of the processor core 106 or of the memory 108, or the like.

The timer interval module 304 defines, manages, handles, and/or updates timer intervals for timers of the start timer module 204. The timer interval module 304 may manage one or more timers, the timer intervals associated with one or more timers, or the like. The timer interval module 304 may cooperate with the start timer module 204 to handle the setting and resetting of timer intervals, and may calculate updated timer intervals based on a computer process entering an executing state on a processor core 106. In one embodiment, the start timer module 204 communicates a probe start time, a current time, and a probe interval to the timer interval module 304 and the timer interval module 304 provides a timer interval to the start timer module 204. The timer interval module 304 may communicate a timer interval to the start timer module 204, may start, stop, or reset timers itself based on a determined timer interval, or the like.

The timer interval module 304 may determine a timer interval based on a probe interval for a computer process and on an amount of time elapsed between a probe start time and the computer process entering the executing state on the processor core 106, as described above with regard to the start timer module 204 of FIG. 2. For example, the timer interval module 304 may determine a timer interval based on a current time and on a probe start time, modulo a probe interval, subtracted from the probe interval, as described above with regard to Equation 1. In one embodiment, the timer interval module 304 sets the probe interval of a computer process as the timer interval when the timer interval is satisfied and the start timer module 204 resets the timer. while the computer process is in the executing state on a processor core 106.

The probe definition module 306 allows a user, another module, a script, computer code, or the like, to define probe parameters for the probe parameter module 202. In one embodiment, the probe definition module 306 provides a user interface allowing a user to define probe parameters for computer processes, such as process identifiers, probe intervals, probe actions, and the like. In a further embodiment, the probe definition module 306 may provide an API allowing other modules to interact with the probe module 104. The probe definition module 306 allows users, modules, scripts, or the like to interact with, use, obtain information from, or otherwise utilize the advantages offered by the probe module 104.

In one embodiment, the probe definition module 306 retrieves one or more probe parameters from a probe definition file. For example, an interval probe may be defined as:

```
@ @interval:<pid>:clock:<probe interval>
{
    /* probe action */
}
```

In this example, "pid" is a process identifier associated with a computer process, "probe interval" is the probe interval associated with the computer process, and a probe action for the computer process is defined between the brackets in computer executable code.

Figure 4A:
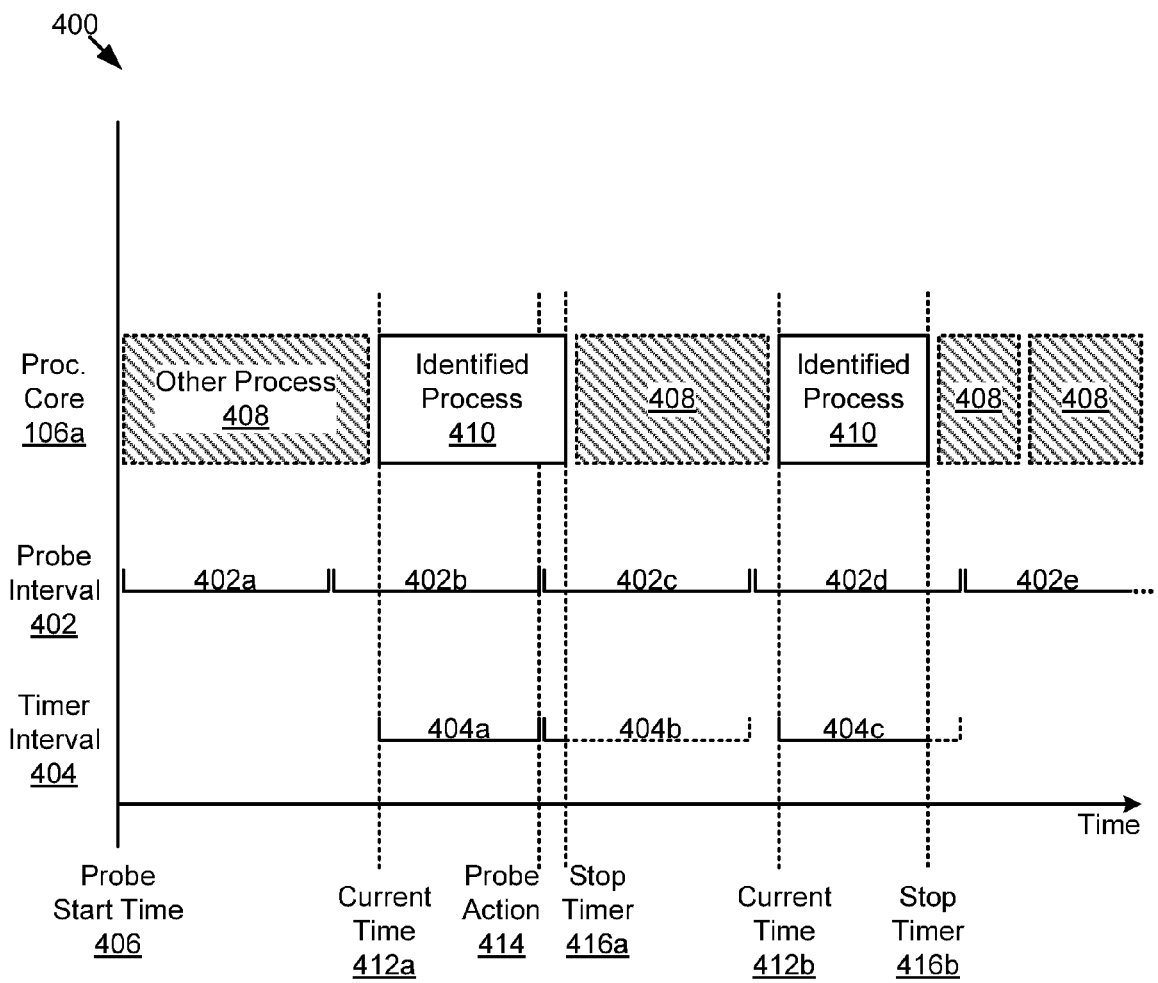
FIG. 4A is a schematic block diagram illustrating one embodiment of probing a computer process over time in accordance with the present invention.

FIG. 4A depicts a graph diagram 400 illustrating the execution of one embodiment of a method for probing a computer process 410 over time. In the depicted embodiment, a single processor core 106a executes multiple computer processes, which include an identified process 410 with a single thread and other processes 408. These processes 408, 410 are in the executing state on the processor core 106a for varying amounts of time, as depicted. The probe interval 402, is regular, and it can be observed that probe intervals 402a, 402b, 402c, 402d, 402e, etc. are intervals of the same length, which may be defined by a user, a computer programmer, a probe definition file, or the like.

In the depicted embodiment, the probe module 104 begins profiling or tracing the identified process 410 at a probe start time 406. The start timer module 204 starts a timer for the identified process 410 when the identified process 410 enters an executing state on the processor core 106a at a current time 412a. The start timer module 204 and/or the timer interval module 304 determine a timer interval 404a for the timer based on a difference between the current time 412a and the probe interval 402, determining how far the current time 412a is into the second cycle 402b of the probe interval 402. The action module 206 executes a probe action 414 for the identified computer process 410 in response to the timer interval 404a being satisfied while the identified process 410 is still executing on the processor core 106a.

In the depicted embodiment, the start timer module 204 and/or the timer interval module 304 reset the timer with the probe interval 402 as the timer interval 404b. Before the reset timer interval 404b is satisfied, however, the identified process 410 exits the executing state on the processor core 106a. In response to the identified process 410 leaving the executing state, the stop timer module 302 stops 416a the timer associated with the identified process 410. Since the stop timer module 302 stopped the timer before the timer interval 404b was satisfied, the action module 206 does not execute the probe action 414 for the third probe interval 402c and the reset timer interval 404b.

In response to the identified process 410 reentering the executing state at the current time 412b, the start timer module 204 starts the timer with a timer interval 404c based on the difference between the current time 412b and the probe interval 402 so that the timer interval 404c is satisfied at the same time as the fourth cycle 402d of the probe interval 402. Upon the identified process 410 stopping execution, the stop timer module 302 stops 416b the timer before the timer interval 404c is satisfied and the action module 206 does not execute the probe action 414 for the fourth probe interval 402d and the timer interval 404c.

In FIG. 4A, the amount of time that the timer associated with the identified process 410 is running during the timer intervals 404, which corresponds to the amount of time that the identified process 410 is in an executing state on the processor core 106a, is significantly less than the amount of time represented by the cycles 402a, 402b, 402c, 402d, and 402e of the probe interval 402. This reduction in time running the timer only when the identified process 410 is dispatched to the processor core 106a uses fewer computing resources than running a timer constantly for each probe interval 402, resulting in improved system performance.

Similarly, in the depicted embodiment, the action module 206 executes the probe action 414 once, in conjunction with the timer firing while the identified process 410 is in the executing state on the processor core 106a. If the probe module 104 were to run a timer constantly, for each cycle 402a-e of the probe interval 402, not only would the timer consume more resources, but the probe module 104 would check the processor core 106a to determine whether or not the identified process 410 is executing each time the probe interval 402 is satisfied, consuming additional resources. Running a timer only when the identified process 410 is executing results in a significant reduction in overhead, resulting in improved system performance.

Figure 4B:
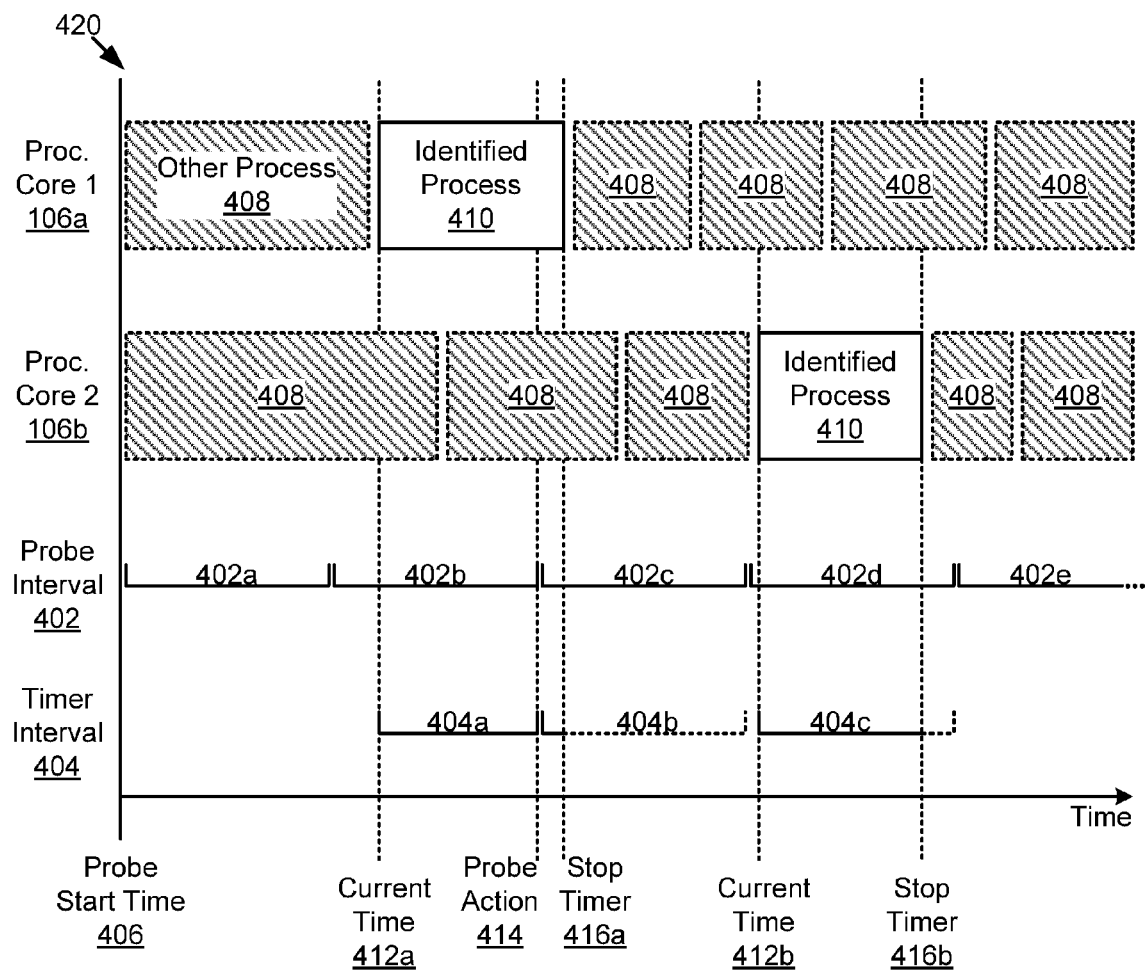
FIG. 4B is a schematic block diagram illustrating another embodiment of probing a computer process over time in accordance with the present invention.

FIG. 4B depicts of a graph diagram 420 illustrating the execution of another embodiment of a method for probing a computer process 410 over time. The graph diagram 420 is substantially similar to the graph diagram 400 of FIG. 4A, except FIG. 4B depicts a single threaded process 410 executing on multiple processor cores 106a, 106b. The single threaded process 410 has only one timer associated with it, regardless of on which of the multiple processor cores 106a, 106b the process 410 is executing.

In the depicted embodiment, the identified process 410 can execute on either of the multiple processor cores 106a, 106b. When the identified process 410 enters the executing state on a processor core 106a or 106b, the start timer module 204 starts a timer associated with the identified process 410. The start timer module 204 and/or the timer interval module 304 set a timer interval 404a for the timer based on the current time 412a and the probe interval 402 to match a current cycle 402b of the probe interval 402. The action module 206 executes the probe action 414 in response to the timer interval 404a being satisfied, which coincides with the probe interval 402b. The start timer module 204 and/or the timer interval module 304 reset the timer 404 with the probe interval 402 as the timer interval 404b in response to the identified process 410 being in the executing state on one of the multiple processor cores 106a and the timer associated with the identified process 410 firing. In response to the identified process 410 exiting the executing state, the stop timer module 302 stops 416a the timer associated with the identified process.

The start timer module 204 restarts the timer associated with the identified process 410 in response to the identified process 410 re-entering the executing state on one of the processor cores 106b. The start timer module 204 and/or the timer interval module 304 set the timer interval 404c for the timer based on the current time 412b and the probe interval 402 to match the fourth cycle 402d of the probe interval 402. The stop timer module 302 stops 416b the timer in response to the identified process 410 exiting the executing state on one of the processor cores 106b.

Figure 4C:
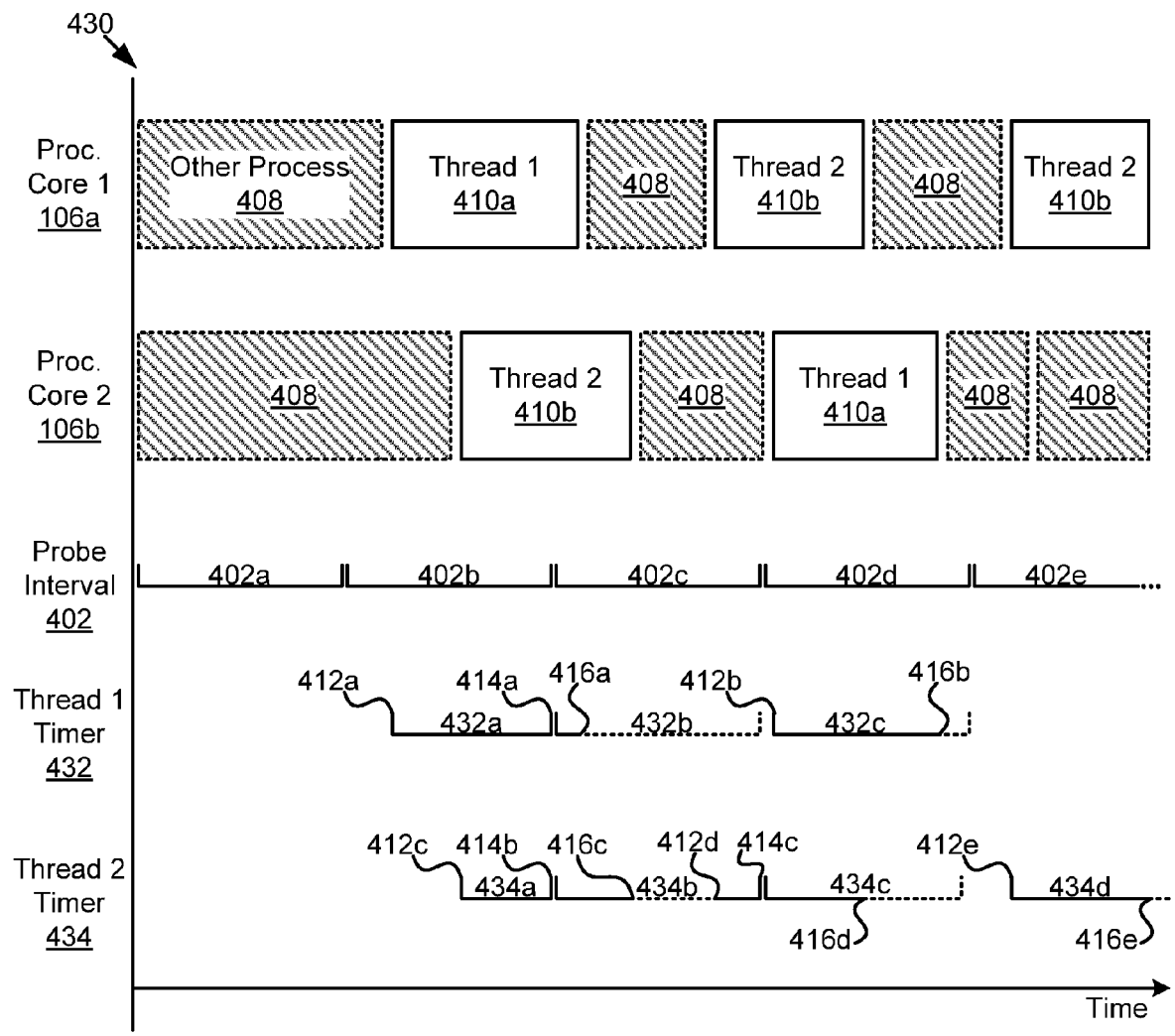
FIG. 4C is a schematic block diagram illustrating a further embodiment of probing a computer process over time in accordance with the present invention.

FIG. 4C depicts a graph diagram 430 illustrating the execution of a further embodiment of a method for probing a computer process 410 over time. In this embodiment, there are multiple processor cores 106a, 106b and multiple threads 410a, 410b of the computer process 410. In the depicted embodiment, the start timer module 204 maintains a different timer for each of the threads 410a, 410b of the identified process 410, and each timer tracks the executing state of the associated thread 410a, 410b regardless of on which of the processor cores 106a, 106b the thread 410a, 410b is executing.

The start timer module 204 starts a thread 1 timer 432 in response to thread 1 410a entering the executing state on processor core 1 106a. The start timer module 204 and/or the timer interval module 304 set the timer interval 432a based on the current time 412a and the probe interval 402. The start timer module 204 starts the thread 2 timer 434 in response to thread 2 410b entering the executing state on processor core 2 106b. The action module 206 executes the probe action 414a, 414b in response to the timer intervals 432a, 434a being satisfied, which coincides with the expiration of the probe interval 402b. The start timer module 204 and/or the timer interval module 304 reset the timers 432, 434 to the probe interval 402 to match the third cycle 402c of the probe interval 402. The stop timer module 302 stops 416a the thread 1 timer 432 in response to thread 1 410a exiting the executing state on processor core 1 106a. The stop timer module 302 stops 416c the thread 2 timer 410b in response to thread 2 410b exiting the executing state on processor core 2 106b.

The start timer module 204 starts the thread 2 timer 434 in response to thread 2 410b entering the executing state on processor core 1 106a. The timer interval module 304 sets the thread 2 timer 434 timer interval 434b based on the current time 412d and the probe interval 402 to match the remainder of the third cycle 402c of the probe interval 402. The action module 206 executes the probe action 414c in response to the timer interval 434b being satisfied, which coincides with the expiration of the probe interval 402c. The start timer module 204 and/or the timer interval module 304 reset the thread 2 timer 434 timer interval 434c to the probe interval 402d.

The start timer module 204 starts the thread 1 timer 432 in response to thread 1 410a entering the executing state on processor core 2 106b. The start timer module 204 and/or the timer interval module 304 set the thread 1 timer 434 timer interval 432c based on the current time 412b and the probe interval 402. The stop timer module 302 stops the thread 2 timer 434 in response to thread 2 410b exiting the executing state on processor core 1 106a. The stop timer module 302 stops the thread 1 timer 432 in response to thread 1 410a exiting the executing state on processor core 2 106b.

The start timer module 204 starts the thread 2 timer 434 in response to thread 2 410b entering the executing state on processor core 1 106a. The start timer module 204 and/or the timer interval module 304 set the thread 2 timer 434 timer interval based on the current time 412e and the probe interval 402 to match the fifth cycle 402e of the probe interval 402. In the depicted embodiment, there is a timer 432, 434 associated with each thread 410a, 410b of the identified process 410 and the timers 432, 434 turn on or off regardless of which of the multiple processor cores 106a 106b the threads 410a, 410b are executing on.

Figure 4D:
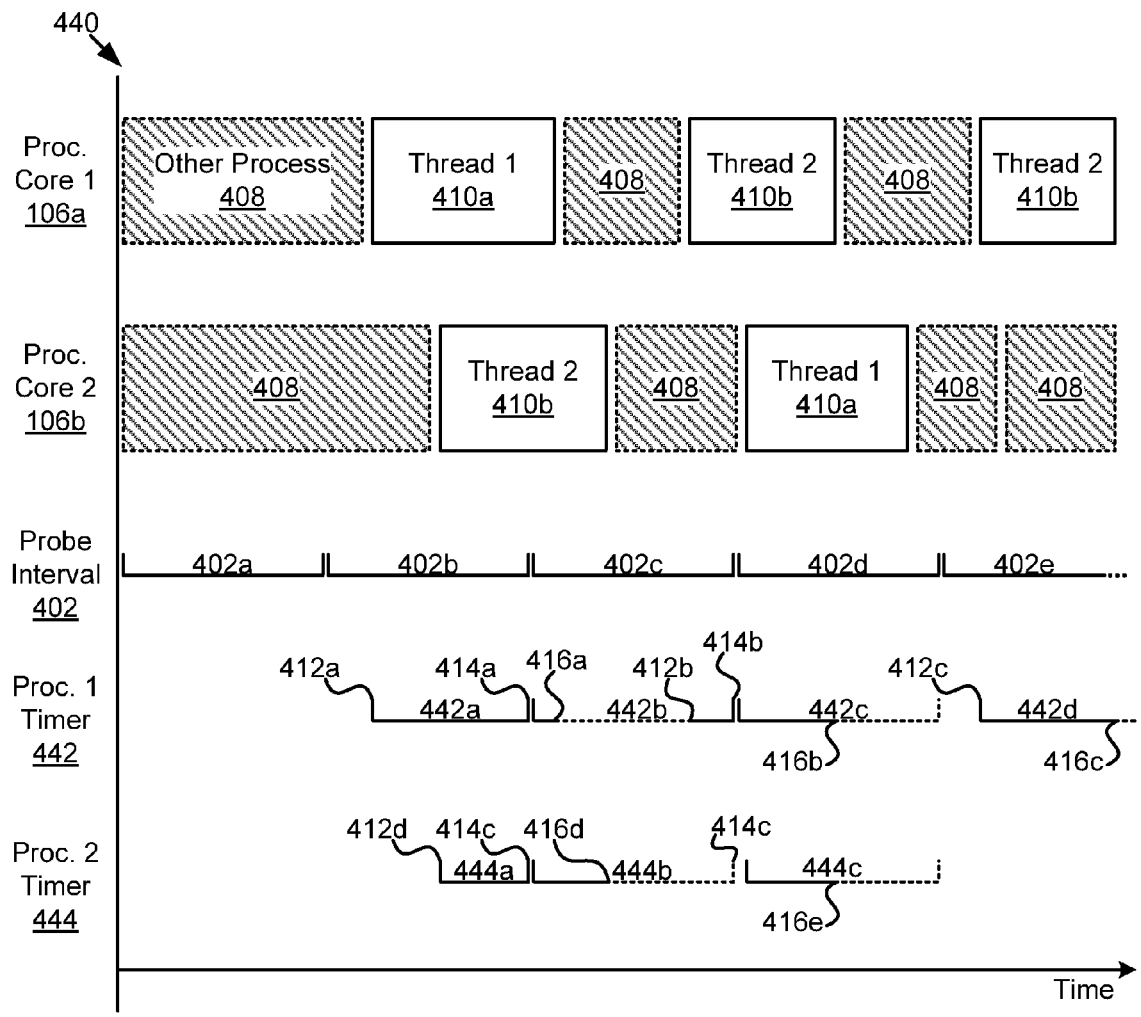
FIG. 4D is a schematic block diagram illustrating an additional embodiment of probing a computer process over time in accordance with the present invention.

FIG. 4D depicts a graph diagram 440 illustrating the execution of an additional embodiment of a method for probing a computer process 410 over time. The depictions in FIG. 4D are substantially similar to those of FIG. 4C, except that instead of having a unique timer 432, 434 associated with each thread 410a, 410b of the identified process 410, there is a unique timer 442, 444 associated with each processor core 106a, 106b. The timers 442, 444 function substantially similarly to the timers 432, 434 of FIG. 4C, except that a timer 442, 444 is started or stopped in response to any of the identified threads 410a, 410b entering the executing state on a processor core 106a, 106b associated with the timer 442, 444. Starting or stopping the timers 442, 444 so that the timers 442, 444 are only running when an identified process 410 (or a thread 410a, 410b of the identified process 410) is in the executing state, there is a significant reduction in the total amount of time that a timer 442, 444 is running 442a, 442b, 442c, 442d, 444a, 444b, 444c, resulting in less degradation of system performance than running timers for each probe interval 402.

Figure 5:
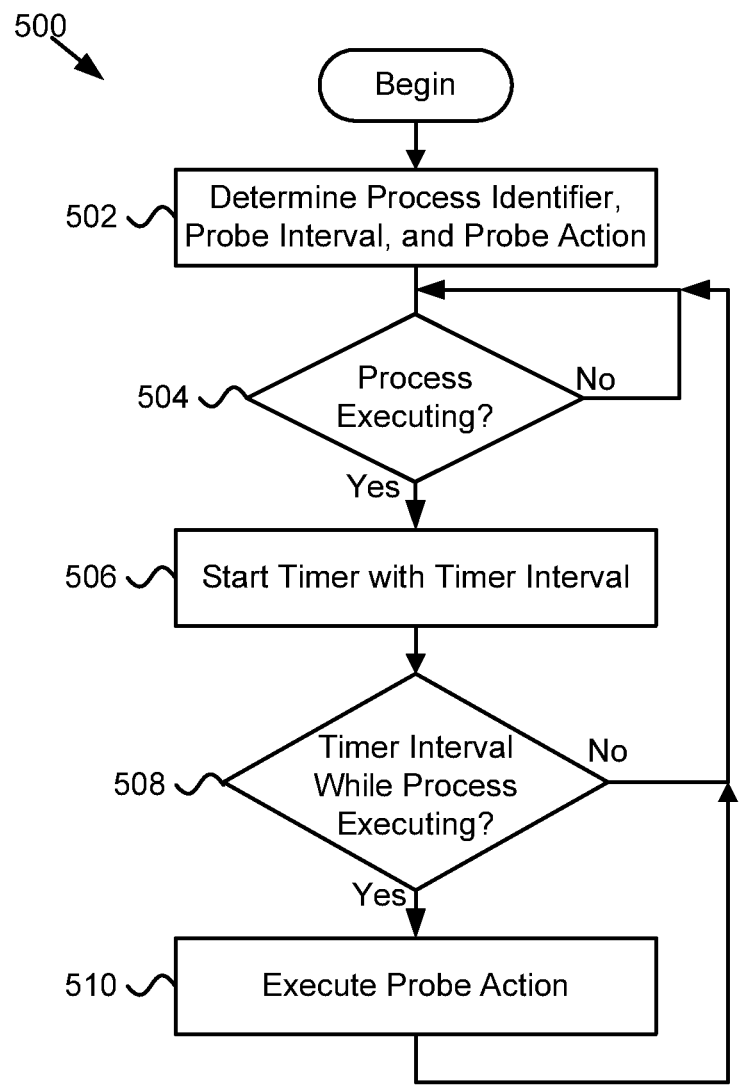
FIG. 5 is a schematic flow chart diagram illustrating one embodiment of a method for probing a computer process in accordance with the present invention.

FIG. 5 depicts one embodiment of a method 500 for probing a computer process. The method 500 begins and the probe parameter module 202 determines 502 a process identifier, a probe interval, and a probe action associated with a computer process. The start timer module 204 determines 504 whether the identified computer process is in the executing state on a processor core 106.

If the start timer module 204 determines 504 that the identified computer process is not in the executing state, the start timer module 204 continues to determine 504 whether the identified computer process is in the executing state. If the start timer module 204 determines 504 that the identified computer process is in the executing state, the start timer module 204 starts 506 a timer for the identified process with a timer interval.

The action module 206 determines 508 whether the timer interval is satisfied while the identified process is in the executing state on a processor core 106. If the identified computer process is in the executing state when the timer interval is satisfied, the action module 206 executes 510 the probe action determined 502 by the probe parameter module 202. If the identified computer process is not in the executing state, then the start timer module 204 continues to determine 504 when the identified computer process returns to the executing state and the method 500 continues.

Figure 6:
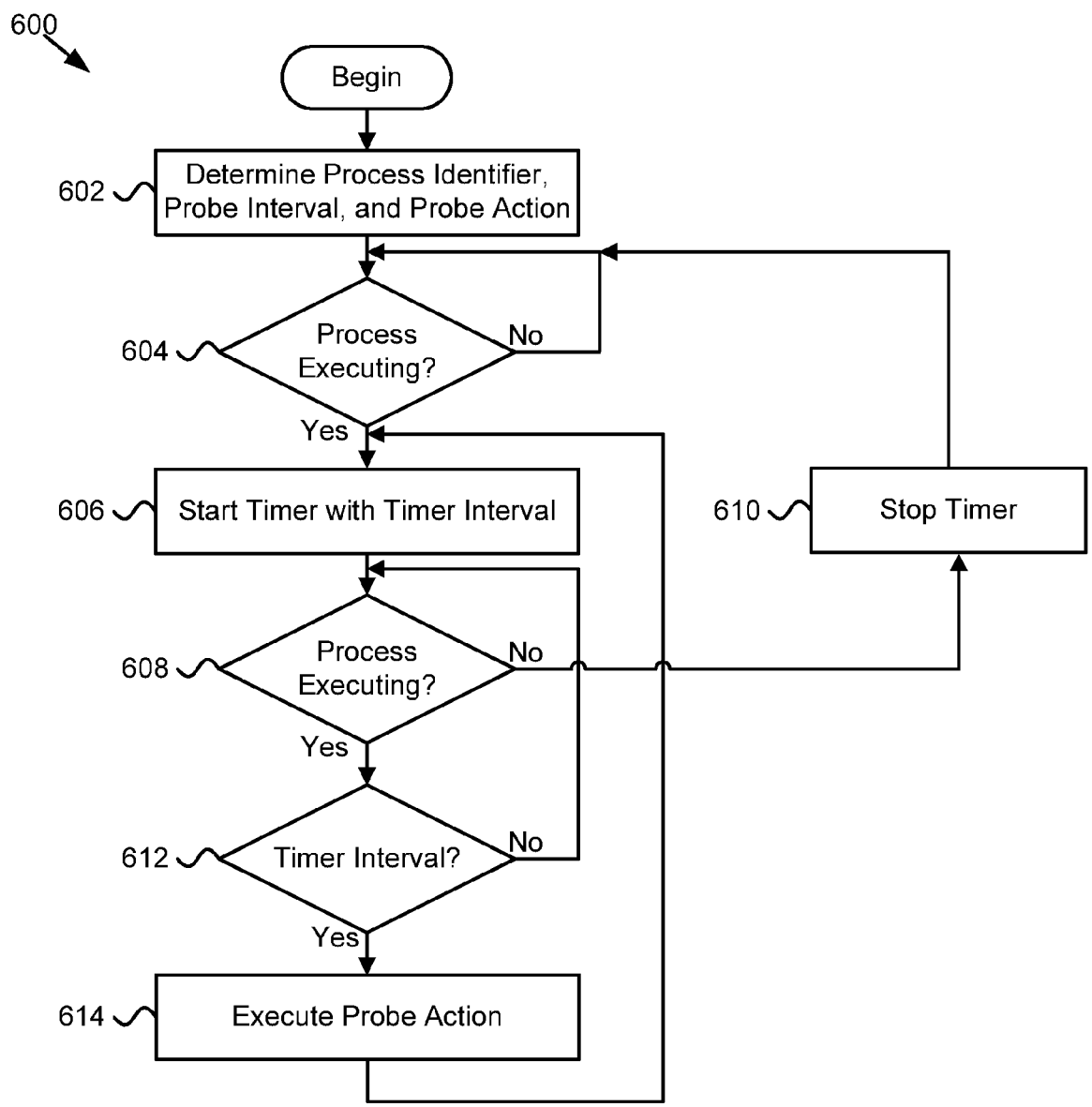
FIG. 6 is a schematic flow chart diagram illustrating another embodiment of a method for probing a computer process in accordance with the present invention.

FIG. 6 depicts another embodiment of a method 600 for probing a computer process. In embodiments where the computer process is multithreaded and the computer device 102 includes multiple processor cores 106, the method 600 may be performed separately for either each thread or for each processor core 106, with either a timer for each thread or a timer for each processor core 106.

The method 600 begins and the probe parameter module 202 determines 602 a process identifier, a probe interval, and a probe action associated with a computer process. The start timer module 204 determines 604 whether the identified computer process is in the executing state on a processor core 106. For example, the start timer module 204 may determine 604 whether any thread of the computer process is executing on a specific processor core 106, whether a specific thread of the computer process is executing on any processor core 106, or the like.

If the start timer module 204 determines 604 that the identified computer process is not in the executing state, the start timer module 204 continues to determine 604 whether the identified computer process is in the executing state. If the start timer module 204 determines 604 that the identified computer process is in the executing state, the start timer module 204 starts 606 a timer for the identified process with a timer interval.

The stop timer module 302 determines 608 whether the identified computer process is still in the executing state on the processor core 106. If the stop timer module 302 determines 608 that the identified computer process has exited the executing state, the stop timer module 302 stops 610 the timer associated with the identified computer process. If the stop timer module 302 determines 608 that the identified computer process is still in the executing state on the processor core 106, the action module 206 determines 612 whether the timer interval is satisfied.

If the action module 206 determines 612 that the timer interval is satisfied, the action module 206 executes 614 the probe action determined 602 by the probe parameter module 202, the start timer module 204 restarts 606 the timer, and the method 600 continues. If the action module 206 determines 612 that the timer interval is not yet satisfied, the stop timer module 302 continues to determine 608 whether the identified computer process is still in the executing state on the processor core 106 and the method 600 continues.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    determining a process identifier, a probe interval, and a probe action, the process identifier uniquely identifying a computer process;
    starting a timer with a timer interval in response to the computer process entering an executing state on a processor core, the timer interval based on the probe interval and on an amount of time elapsed between a probe start time and the computer process entering the executing state on the processor core; and
    executing the probe action in response to the timer satisfying the timer interval while the computer process is in the executing state on the processor core.

2. The method of claim 1, further comprising stopping the timer in response to the computer process exiting the executing state on the processor core such that the timer does not run while the computer process is not in the executing state.

3. The method of claim 2, further comprising restarting the timer with an updated timer interval in response to the computer process reentering the executing state, the updated timer interval based on the probe interval and an amount of time elapsed between the probe start time and the computer process reentering the executing state.

4. The method of claim 1, further comprising restarting the timer with the probe interval as the timer interval in response to the timer satisfying the timer interval while the computer process is in the executing state on the processor core.

5. The method of claim 4, further comprising re-executing the probe action in response to the restarted timer satisfying the timer interval while the computer process is in the executing state on the processor core.

6. The method of claim 1, wherein the processor core comprises a first processor core of a plurality of processor cores on which the computer process may execute.

7. The method of claim 6, wherein the computer process comprises a single thread and the timer is started in response to the computer process entering an executing state on any one of the plurality of processor cores.

8. The method of claim 6, wherein the timer comprises a first timer corresponding to the first processor core and the method further comprises:
    starting a second timer corresponding to a second processor core of the plurality of processor cores in response to a thread of the computer process entering an executing state on the second processor core, the computer process comprising a plurality of threads, the second timer started with a second timer interval based on the probe interval and on an amount of time elapsed between the probe start time and the thread of the computer process entering an executing state on the second processor core; and
    executing the probe action in response to the second timer satisfying the second timer interval while the thread of the computer process is in the executing state on the second processor core.

9. The method of claim 6, wherein the computer process comprises a plurality of threads, the timer comprises a first timer corresponding to a first thread of the plurality of threads, and the method further comprises:
    starting a second timer corresponding to a second thread of the plurality of threads in response to the second thread entering an executing state on a processor core of the plurality of processor cores, the second timer started with a second timer interval based on the probe interval and on an amount of time elapsed between the probe start time and the second thread entering an executing state on the processor core of the plurality of processor cores; and
    executing the probe action in response to the second timer satisfying the second timer interval while the second thread of the computer process is in the executing state on the processor core of the plurality of processor cores.

10. The method of claim 1, wherein determining the process identifier, starting the timer, and executing the probe action are performed separately from the computer process identified by the process identifier without executable code to determine the process identifier, track the amount of time, and execute the probe action compiled into the computer process.

11. The method of claim 1, wherein the amount of time elapsed between the probe start time and the computer process entering the executing state on the processor core comprises one or more cycles of the probe interval and the timer interval comprises an amount of time remaining in a current cycle of the probe interval.

12. The method of claim 11, wherein the amount of time remaining in a current cycle of the probe interval comprises a difference between a current time and the probe start time, modulo the probe interval, subtracted from the probe interval.

13. An apparatus comprising:
a probe parameter module that determines a process identifier, a probe interval, and a probe action, the process identifier uniquely identifying a computer process;
a start timer module that starts a timer with a timer interval in response to the computer process entering an executing state on a processor core, the timer interval based on the probe interval and on an amount of time elapsed between a probe start time and the computer process entering the executing state on the processor core; and
an action module that executes the probe action in response to the timer satisfying the timer interval while the computer process is in the executing state on the processor core,
wherein at least a portion of the probe parameter module, the start timer module, and the action module comprise one or more of hardware and executable code, the executable code stored on one or more computer readable storage media.

14. The apparatus of claim 13, further comprising a stop timer module that stops the timer in response to the computer process exiting the executing state on the processor core such that the timer does not run while the computer process is not in the executing state.

15. The apparatus of claim 14, wherein the start timer module restarts the timer with an updated timer interval in response to the computer process reentering the executing state, the updated timer interval based on the probe interval and an amount of time elapsed between the probe start time and the computer process reentering the executing state.

16. The apparatus of claim 13, wherein the start timer module restarts the timer with the probe interval as the timer interval in response to the timer satisfying the timer interval while the computer process is in the executing state on the processor core and the action module re-executes the probe action in response to the restarted timer satisfying the timer interval while the computer process is in the executing state on the processor core.

17. The apparatus of claim 13, wherein the processor core comprises a first processor core of a plurality of processor cores on which the computer process may execute, the computer process comprises a plurality of threads, the start timer module maintains a plurality of timers, and the plurality of timers comprises a timer for each processor core of the plurality of processor cores.

18. The apparatus of claim 13, wherein the processor core comprises a first processor core of a plurality of processor cores on which the computer process may execute, the computer process comprises a plurality of threads, the start timer module maintains a plurality of timers, and the plurality of timers comprises a timer for each thread of the plurality of threads.

19. The apparatus of claim 13, wherein the probe parameter module, the start timer module, and the action module operate separately from the computer process identified by the process identifier without executable code of the probe parameter module, the start timer module, and the action module compiled into the computer process.

20. The apparatus of claim 13, wherein the amount of time elapsed between the probe start time and the computer process entering the executing state on the processor core comprises one or more cycles of the probe interval and the timer interval comprises an amount of time remaining in a current cycle of the probe interval.

21. A system comprising:
a processor core;
a probe parameter module that determines a process identifier, a probe interval, and a probe action, the process identifier uniquely identifying a computer process;
a start timer module that starts a timer with a timer interval in response to the computer process entering an executing state on the processor core, the timer interval based on the probe interval and on an amount of time elapsed between a probe start time and the computer process entering the executing state on the processor core; and
an action module that executes the probe action in response to the timer satisfying the timer interval while the computer process is in the executing state on the processor core.

22. The system of claim 21, further comprising one or more additional processor cores, the processor core and the one or more additional processor cores comprising a plurality of processor cores on which the computer process may execute.

23. The system of claim 22, wherein the computer process comprises a plurality of threads, the start timer module maintains a plurality of timers, and the plurality of timers comprises one of a timer for each processor core of the plurality of processor cores and a timer for each thread of the plurality of threads.

24. The system of claim 21, further comprising a computer device comprising the processor core, the computer device executing the computer process on the processor core.

25. A method comprising:
determining a process identifier, a probe interval, and a probe action, the process identifier uniquely identifying a computer process;
starting a timer with a timer interval in response to the computer process entering an executing state on a processor core, the timer interval based on the probe interval and on an amount of time elapsed between a probe start time and the computer process entering the executing state on the processor core, the amount of time elapsed between the probe start time and the computer process entering the executing state on the processor core comprising one or more cycles of the probe interval, the timer interval comprising an amount of time remaining in a current cycle of the probe interval;
executing the probe action in response to the timer satisfying the timer interval while the computer process is in the executing state on the processor core; and
stopping the timer in response to the computer process exiting the executing state on the processor core such that the timer does not run while the computer process is not in the executing state;
wherein determining the process identifier, starting the timer, executing the probe action, and stopping the timer are performed separately from the computer process identified by the process identifier without executable code to determine the process identifier, track the amount of time, execute the probe action, and stop the timer compiled into the computer process.

\* \* \* \* \*